United States Patent [19]
Cina et al.

[11] Patent Number: 5,504,828
[45] Date of Patent: Apr. 2, 1996

[54] APPARATUS FOR EXTENDING BANDWIDTH OF LARGE CORE FIBER OPTIC TRANSMISSION LINKS

[75] Inventors: Michael F. Cina, Hopewell Junction, N.Y.; Dennis L. Karst, Kasson, Minn.; Modest M. Oprysko, Mahopac, N.Y.; Mark B. Ritter, Danbury, Conn.; Jeannine M. Trewhella, Peekskill, N.Y.

[73] Assignee: International Business Machines Corporation, Armonk, N.Y.

[21] Appl. No.: 328,291

[22] Filed: Oct. 24, 1994

Related U.S. Application Data

[63] Continuation of Ser. No. 269,046, Jun. 29, 1994, abandoned.
[51] Int. Cl.⁶ ..................... G02B 6/32
[52] U.S. Cl. ............... 385/33; 385/27; 385/93
[58] Field of Search ............... 385/27, 28, 31, 385/33–35, 38, 39, 88–94

[56] References Cited

U.S. PATENT DOCUMENTS

| | | | |
|---|---|---|---|
| 3,656,832 | 4/1972 | Judin | 385/35 |
| 3,759,590 | 9/1973 | Arnaud | 385/33 |
| 3,773,289 | 11/1973 | Gloge | 385/31 X |
| 3,832,030 | 8/1974 | Gloge | 385/33 |
| 4,077,701 | 3/1978 | Steensma et al. | 385/27 X |
| 4,183,618 | 1/1980 | Rush et al. | 385/79 |
| 4,186,995 | 2/1980 | Schumacher | 385/93 |
| 4,421,383 | 12/1983 | Carlsen | 385/79 |
| 4,616,899 | 10/1986 | Schlafer | 385/93 |
| 4,691,985 | 9/1987 | Shank et al. | 385/84 |
| 4,707,067 | 11/1987 | Haberland et al. | 385/90 |
| 4,726,645 | 2/1988 | Yamashita et al. | 385/35 |
| 4,726,648 | 2/1988 | Haberland et al. | 385/93 |
| 4,790,618 | 12/1988 | Abe | 385/93 |
| 4,814,118 | 3/1989 | Plummer et al. | 264/2.2 |
| 4,830,453 | 5/1989 | Khoe | 385/35 |
| 4,836,635 | 6/1989 | DeAmorim | 385/89 |

(List continued on next page.)

FOREIGN PATENT DOCUMENTS

| | | |
|---|---|---|
| 0025728 | 3/1981 | European Pat. Off. . |
| 0094710 | 11/1983 | European Pat. Off. . |
| 3621249 | 1/1988 | Germany . |
| 3705408 | 8/1988 | Germany . |
| 4022076 | 1/1992 | Germany . |
| 2-19804 | 1/1990 | Japan . |
| 2-33112 | 2/1990 | Japan . |
| 2-54207 | 2/1990 | Japan . |

OTHER PUBLICATIONS

Kato, "Light Coupling from a Stripe–Geometry GaAs Diode Laser into an Optical Fiber with Spherical End," *J. Appl. Phys.*, vol. 44, No. 6, Jun. 1973, 3 pp.

Kohanzadeh, "Injection Laser Coupling to Optical Waveguides with Integral Lenses," *J. Appl. Phys.*, vol. 47, No. 1, Jan. 1976, pp. 177–179.

Kolodzey et al., "Optical Connector Measurement System," *IBM Technical Disclosure Bulletin*, vol. 22, No. 1, Jun. 1979, pp. 47–48.

Data Sheet 79–526 for "AMP Optimate Connector for Active Devices," *Revised 4–79*, 2 pp., AMP Incorporated.

*Primary Examiner*—John D. Lee
*Attorney, Agent, or Firm*—Scully, Scott, Murphy & Presser

[57] ABSTRACT

An optical fiber transmission apparatus for limiting the optical modes which were emitted from a source in such a way to impinge on an optical fiber to extract a high bandwidth from the fiber. The apparatus includes a lens or aperture to control the angle and distribution of light launched into the fiber. The apparatus achieves reproducibly high bandwidths in large core step-index optical fibers of short transmission length distances. The lens or aperture introduces light from the source into the fiber at an angle at which substantially no intermode delay occurs as the light propagates down the fiber. An integral fiber optic coupling assembly that includes an optical electronic component receptacle, the lens and/or aperture, and an optical fiber connector interface which provides low cost easy to manufacture assembly is also disclosed. A unitary plastic housing provides the function of a lens and mechanical reference or locating features for the light source and optical fiber.

27 Claims, 3 Drawing Sheets

U.S. PATENT DOCUMENTS

| | | | |
|---|---|---|---|
| 4,842,391 | 6/1989 | Kim et al. | 385/35 |
| 4,904,043 | 2/1990 | Schweizer | 359/188 |
| 4,925,267 | 5/1990 | Plummer et al. | 385/74 |
| 5,054,018 | 10/1991 | Tremblay | 385/33 X |
| 5,073,047 | 12/1991 | Suzuki et al. | 385/93 |
| 5,077,819 | 12/1991 | Greil et al. | 385/79 |
| 5,094,518 | 3/1992 | Musk | 385/35 |
| 5,107,537 | 4/1992 | Schriks et al. | 385/91 |
| 5,191,629 | 3/1993 | Kaiser | 385/90 |

# APPARATUS FOR EXTENDING BANDWIDTH OF LARGE CORE FIBER OPTIC TRANSMISSION LINKS

This application claims the benefit of the filing date of U.S. application Ser. No. 08/269,046 filed Jun. 29, 1994 (and now abandoned) entitled, "APPARATUS FOR EXTENDING BANDWIDTH OF LARGE CORE FIBER OPTIC TRANSMISSION LINKS" to Michael F. Cina et al as a continuation thereof.

CROSS REFERENCE TO RELATED APPLICATION

U.S. application Ser. No. 08/328,177 to Cina et al. filed on the same day herewith is entitled and directed to a "Method for Extending Bandwidth of Large Core Fiber Optic Transmission Links", the teaching of which is incorporated herein by reference describes a method for making an optical fiber transmission apparatus for limiting the optical modes which were emitted from a source in such a way to impinge on an optical fiber to extract a high bandwidth from the fiber. The apparatus includes a lens or aperture to control the angle and distribution of light launched into the fiber. The apparatus achieves reproducibly high bandwidths in large core step-index optical fibers of short transmission length distances. The lens or aperture introduces light from the source into the fiber at an angle at which substantially no intermode delay occurs as the light propagates down the fiber. An integral fiber optic coupling assembly that includes an optical electronic component receptacle, the lens and/or aperture, and an optical fiber connector interface which provides low cost easy to manufacture assembly is also disclosed. A unitary plastic housing provides the function of a lens and mechanical reference or locating features for the light source and optical fiber.

BACKGROUND OF THE INVENTION

1. Field of the Invention

The invention relates to optical fiber launch controls for improving the bandwidth of large core fibers of relatively short communication links and more particularly to an optical coupling apparatus that limits the optical modes launched into such fibers. In addition the invention is directed to a low cost, easy to assemble fiber optic coupling sub-assembly.

2. Description of the Prior Art

Fiber-optical communication links, because of their ability to carry vastly more information than equivalent sizes of electrical wires, will be the "infrastructure" of the much talked about information highway. In optical communication, sources of light, such as lasers, are connected to optical fibers which carry the signal over both long and short distances to optical receivers. Optical fibers typically have a central region of a high index of refraction surrounded by a cladding region of a lower index of refraction. Optical signals launched into the fiber propagate along its length in a multiplicity of optical modes. A problem with long fibers such as 1 km or longer, is that the time taken for the transmission of a signal via the different optical modes through the fiber varies, so that a rapid sequence of individual pulses fed into the fiber at one end can be smeared out into a continuous stream at the other end and all information is lost. To prevent this, fibers are being made with a radial gradient of refractive index having a parabolic cross section of index. In this way, the velocity of the various modes is compensated to reduce transit time variations among the modes. The number of possible modes can also be reduced by making the fiber very thin, i.e., of dimensions comparable to the wavelength of the light.

For such long, thin fibers, it is assumed that all optical modes, described the by angle $\theta$ at which they propagate down the fiber, are equally coupled to near neighbor modes and so equally couple and mix as the modes propagate down the fiber. If one allows the light to propagate for a sufficiently long distance, such as a kilometer, down such a fiber, all of the modes should be mixed together and from then on the effective fiber bandwidth will not vary with launch conditions.

Most data communications applications, however, require links under 500 m, the majority of which are under 100 m in length. In this length regime, the standard theory predicts great variation in fiber bandwidth with launch angle, even for small angles.

Fibers used in these shorter links are typically of a large core design, such as a step-index optical fiber. These fibers, because of their large cross-sectional areas, have a smaller bandwidth than fibers with small cross-sectional areas. Large core step-index optical fibers are known to exhibit intermode dispersion due to various postulated optical mode propagation and diffusion mechanisms. There has been experimental work which shows a large variation in fiber bandwidth upon changing the source (LED or laser) or the launch optics. This variation in bandwidth with launch has relegated the use of large core fibers to rather low data rates because the details of the variation in fiber performance with launch are not understood. Thus, there is a need to understand the mode propagation in a large core fiber and from that understanding derive launch design rules and optical structures to achieve reproducibly higher bandwidth in large core, short link fibers.

SUMMARY OF THE INVENTION

The present invention is directed to an optical fiber light transmission apparatus for improving the bandwidth of large core, step-index, short length optical fiber links. The bandwidth improvement is achieved by providing a launch condition control assembly that includes a launch means for introducing light from an optoelectronic component into the fiber at an angle less than or equal to a predetermined angle $\theta_M$, where $\theta_M$ is the maximum angle at which substantially no intermode delay will occur as the light propagates down the fiber. An optical fiber launch condition control assembly incorporates three basic components, an optoelectronic component for generating light, an optical fiber and a fiber optic coupling assembly. The usefulness of the present invention is in relatively short length fiber optic links which typically are 500 meters or less as well as in large core fibers which have a diameter of typically 200 microns or greater. The inventors herein have determined that for such short, large core fibers, all modes within the fiber are not equally coupled as previously assumed. Rather, some low angle modes quickly scatter toward the zero angle mode which was quite unexpected from previous theory. Thus, the inventors determined that based on this new theory, a reproducibly high bandwidth can be achieved by eliminating the high angle modes. For each particular application, a predetermined angle $\theta_M$ is found by experimentation to be the maximum angle at which substantially no intermode delay will occur without resulting in an improved fiber optical bandwidth. Launch means are then designed to limit the angle of light introduced into the filter to $\theta_M$ or less.

One launch means for introducing light at less than the maximum angle is by the use of an optical lens. Another option is an aperture that blocks out the unwanted angles. In practice, it has been determined that a poor optical lens such as one having a substantial amount of spherical aberrations actually works well in limiting the launch angles introduced into the fiber. In a preferred embodiment, the launch means is integral with the fiber optic coupling assembly. The coupling assembly includes an optoelectronic component receptacle, the launch means and an optical fiber connection means. In a more particular preferred embodiment the integral fiber optic coupling assembly is composed of integrally molded plastic in which the launch means is a plastic lens formed in the molding process.

Thus, the prior art practice of maximizing the power launched into an optical fiber is the incorrect design criteria for large core, step-index, short distance fiber optic links. Higher data rates are achieved when the launch modes are limited to those which will mix together quickly in a fiber over a short length. The optical fiber light transmission apparatus of the present inventions launches only a fraction of the power so that the light will propagate in desired modes and provide an improved fiber optical bandwidth.

DETAILED DESCRIPTION OF THE INVENTION

The present invention is directed to an optical fiber apparatus for providing reproducibly higher data rates by exploiting heretofore unknown transmission properties of large core short distance optical fiber links. In the prior art, it was known that launch conditions affected fiber bandwidth and, further, that large core optical fibers were avoided where high data rates were desired because a large variation in fiber bandwidth existed for large core fibers. Experimental work of the inventors herein have shown that previous theoretical descriptions of optical mode propagation within a large core fiber were derived from incorrect assumptions. The power flow equations of Gloge (1972) assumed all optical modes equally couple and mix as the modes propagate down the fiber. This theory, however, does not hold true for short distance cable links of 500 meters or less. The inventors study of pulse propagation in large core plastic clad silica fiber has shown that all modes within the fiber are not equally coupled. Rather, some low angle modes quickly scatter toward the zero angle mode. Practically, this means that for a 500 meter or less data transmission link, one can launch into these modes which are quickly homogenized and retrieve a reproducible and higher bandwidth. To achieve this reproducibly higher bandwidth, the launch control assembly must include means for limiting the angular spread of light launched into the fiber. The launch means utilized in the fiber optic transmission apparatus of the present invention introduces light from an optoelectronic source component to the fiber at an angle less than or equal to a predetermined maximum angle $\theta_M$, where $\theta_M$ is the maximum angle at which substantially no intermode delay will occur as the light propagates down the fiber. By providing a launch angle sufficiently less than the angle light is diverging from the source component, eliminates the high angle modes and results in an improved optical fiber bandwidth.

Figure 1:
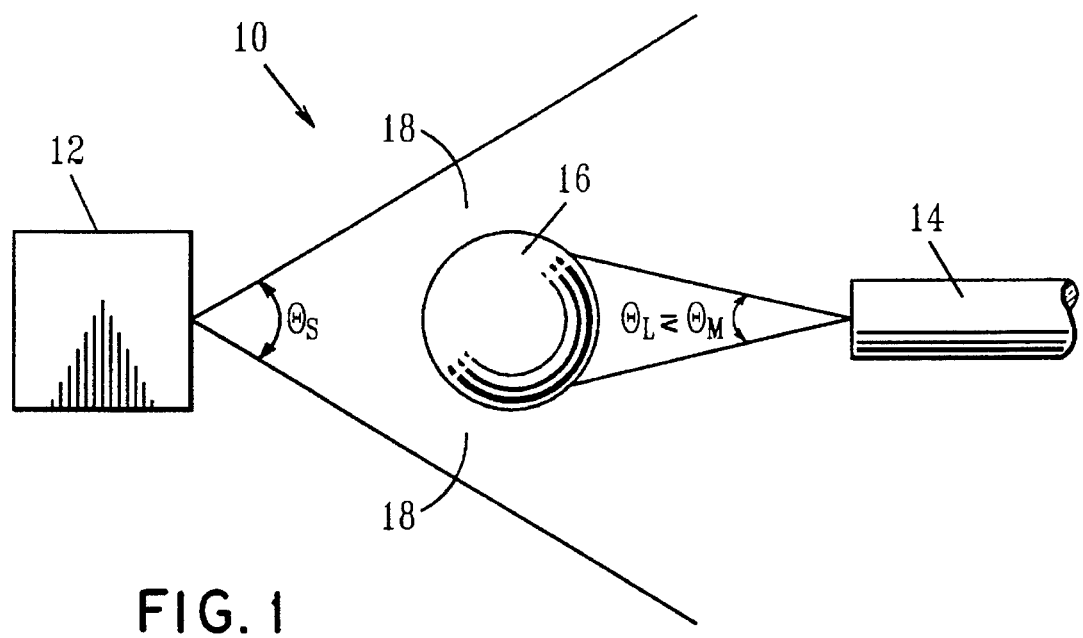
FIG. 1 is a schematic of one embodiment of the optical fiber light transmission apparatus of the present invention.

Two examples of means for limiting the optical modes of the light launched into the fiber are an optical lens and an optical aperture. FIG. 1 is a schematic of an optical fiber light transmission apparatus in which a lens is used as a launch means for limiting the optical modes launched into the fiber. As shown in FIG. 1, the optical fiber light transmission apparatus 10 includes an optoelectronic component 12 for generating light diverging at an angle $\theta_S$. Optical fiber 14 is a large core fiber of, for example, 200 microns in diameter or greater, used in a short distance data links of, for example, 500 meters or less. Launch means 16 is an optical lens that introduces light from the optoelectronic component 12 into the fiber 14 at an angle $\theta_L$ less than or equal to an angle $\theta_M$. $\theta_M$ is less than $\theta_S$ for typical sources, and is the maximum angle at which substantially no intermode delay will occur as a light propagates down the fiber 14. In the embodiment shown in FIG. 1, the size and positioning of the optical lens 16 results in limiting the launch modes introduced into the fiber 14. As can be seen, the high angle modes, transmitted at spaces 18, are not captured by lens 16 and therefore are not introduced into fiber 14. An alternative embodiment is to employ a poor quality lens that captures all of the light diverging from the source but having less coupling efficiency than normally achieved with good optical lens components. For example, a poor lens could have a substantial amount of spherical aberrations which result in the high angle modes not being launched into the fiber 14.

An example of an optical fiber light transmission apparatus of the present invention was constructed employing a Mitsubishi 40116 laser diode as the optoelectronic light source component 12 for introducing light into a plastic clad 200/230 μm silica fiber 100 meters long. A poor quality lens, having a substantial amount of spherical aberrations, was used as lens 16. Operation of the light source resulted in the fiber having a bandwidth of 130 MHz. A very good Grin lens was then substituted for lens 16 so that the optical modes launched into the fiber were maximized and a bandwidth of under 90 MHz resulted. Thus, an increase of about 45% in the bandwidth was achieved. The present invention will result generally in an increased bandwidth in the range of 30% to 60%.

Figure 2:
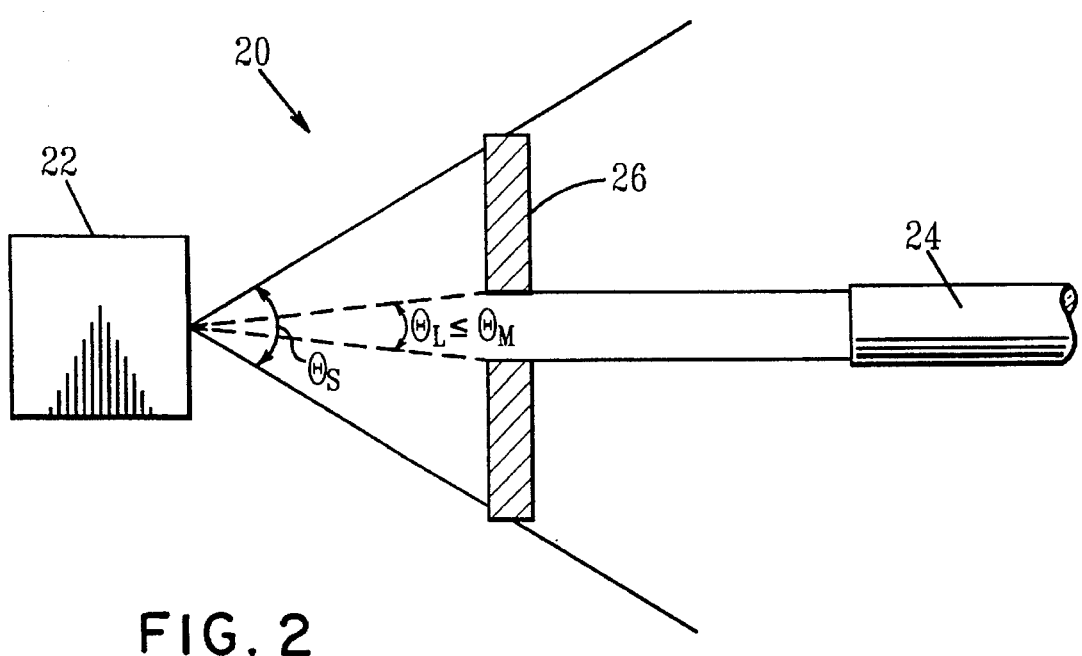
FIG. 2 is a schematic of a second embodiment of the optical fiber light transmission apparatus of the present invention.

Another embodiment of the apparatus of the present invention is shown in FIG. 2. The optical fiber light transmission apparatus 20 includes an aperture 26 which limits the angle of light from light source 22 launched into the fiber 24 to the angle $\theta_L$, which is less than $\theta_S$ and also less than or equal to $\theta_M$.

The launch means of the optical fiber light transmission apparatus of the present invention is manufactured as a component of a fiber optic coupling assembly for coupling a light source to an optical fiber. Optical coupling subassemblies as known in the art consist of three basic components: an optoelectronic component receptacle, a lens retainer and a fiber connector. Each of these components must be actively aligned to each other and then fixed in place by soldering or other means. This assembly process is both labor and capital intensive resulting in expensive coupling assemblies. The high cost of these assemblies is one of the greatest impediments to the general proliferation of fiber optics and data communications. Alignment tolerances for large core fibers is significantly less than for thin fibers. Therefore, the launch control means of the present invention which results in significantly higher and reproducible bandwidths for large core fibers will now permit such fibers to be more widely used so that the cost savings resulting from the higher alignment tolerances of the large core fibers can be realized. In addition, by permitting the use of poor lenses which allows plastic molded lenses to be used in place of the standard high precision glass lenses results in an overall low cost, easy to assemble fiber optic coupling subassembly providing significantly higher fiber bandwidth.

In a preferred embodiment of the present invention the launch means for limiting the optical modes launched into the fiber is integral with the fiber optic coupling assembly. The integral fiber optic coupling assembly in this embodiment includes an optoelectronic component receptacle, the launch means and an optical fiber connector means. In a further preferred embodiment of the present invention, the launch means is a single plastic molded lens integral with an optical coupling assembly having mechanical locating and fixing features that eliminates the alignment procedures necessary with prior art coupling assemblies. The optical coupling assembly having the integral lens together with the locating and fixing features are all made in the same molding step. Thus, a light source such as a laser diode can be press fit into the optoelectronic device receptacle on one end of the coupling assembly while the other end will be adapted to conform to the desired optical fiber connector. The launch conditions may be controlled by changing the lens shape in the mold or by including an aperture in order to improve the bandwidth of low cost large core fibers. The optical assembly of the present invention is easy to assembly and has a reduced part count while eliminating the special assembly facilities and expensive capital tooling required by prior art precision optical coupling assemblies. In another feature of the present invention, an optical subassembly integral lens can be manufactured with a built in asymmetry to eliminate potential defects along the optical access which can arise during the molding process.

Figure 3:
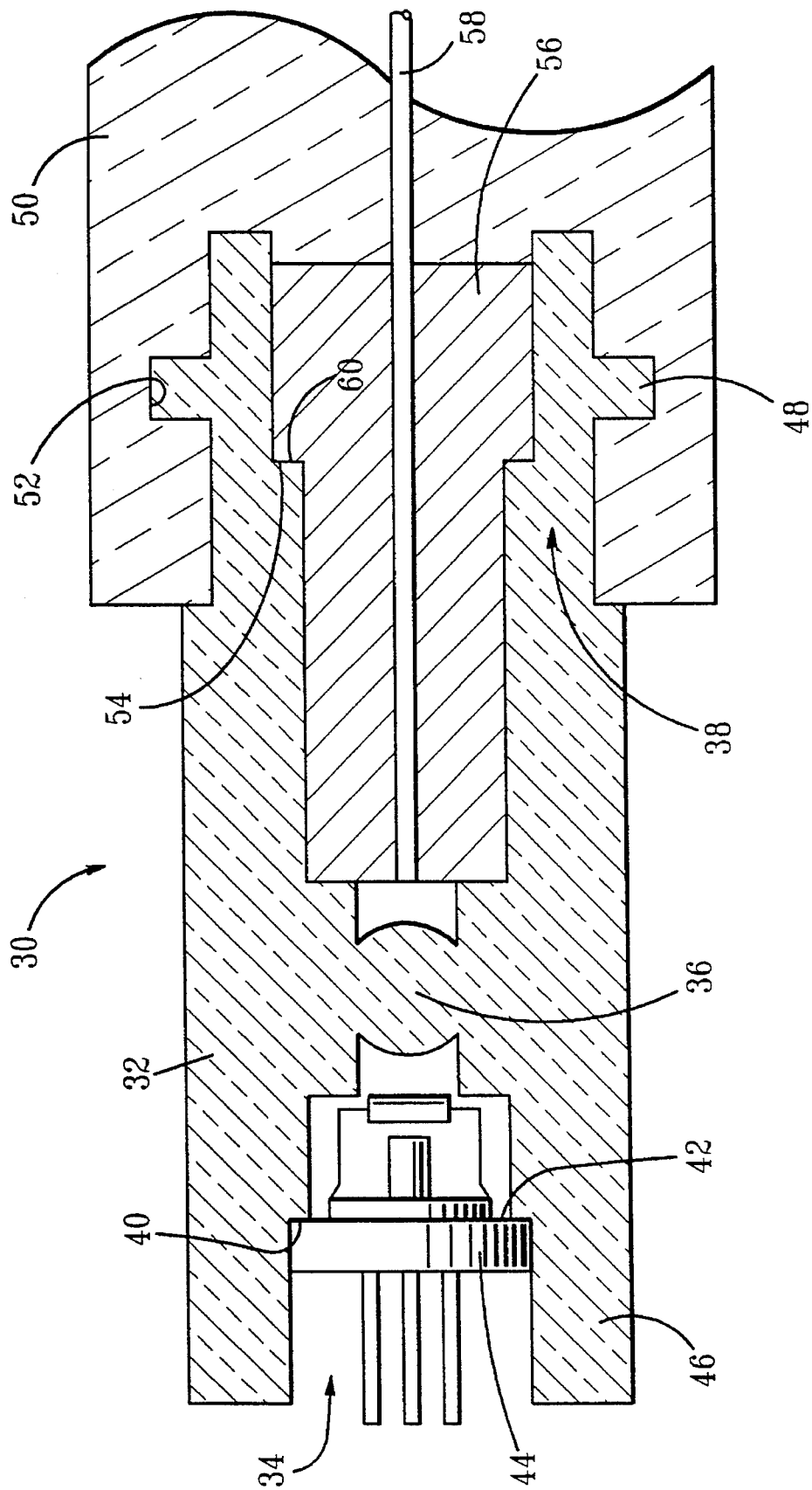
FIG. 3 is a cross-sectional diagram of an integral fiber optic coupling assembly of the present invention.

FIG. 3 shows one example of the plastic molded fiber optic coupling assembly of the present invention. The coupling assembly 30 includes a subassembly body 32 having an optoelectronic component receptacle region 34, an integral launch means 36 shown in FIG. 3 as a spherical lens and an optical fiber connector interface means 38. The receptacle means 34 includes a shoulder 40 that engages a flange 42 of an optoelectronic light source component 44. The receptacle means 34 is designed so that a TO-can containing a short wavelength CD laser can be press fit into a portion 46 having an inside diameter opening slightly smaller than the outside diameter of the TO-can. The shoulder 40 is a locating means for fixing the position of the optoelectronic component with respect to the launch means 36.

The interface connector means 38 includes a detent 48 on the outer circumference which provides connection means to a fiber optic connection bushing 50 by mating to a complementary shaped channel 52. Interface means 38 also includes a shoulder 54 that acts as a locating means for fixing the position of the optical fiber connector 56 and hence optical fiber 58 with respect to the launch means 36. The connector 56 includes a shoulder 60 complementarily shaped to shoulder 54.

The TO-can is automatically centered with respect to the optical axis of the coupling assembly 30 and is positioned at the proper axial distance from the lens 36 by the shoulder 40.

The optical fiber connector interface 38 is adapted to mate with the desired fiber optic connector such as a crimp and cleave ST®-type connector containing a large core glass (200/230 μm) fiber. Other connectors such as FC, SMA, Versatile®link, SC®, etc. can readily be adapted in either simplex or duplex versions. Other large core fibers such as 300 μm, 400 μm and graded index can be used. Plastic optical fibers can also be used. Graded index, large core fibers offer the possibility of extending the performance of the plastic optical fiber links into the Gb/S range.

The optical coupling assembly 30 of FIG. 3 is a snap-together low cost plastic optical subassembly. No alignment of the optical components is needed. A snap-together optical coupling assembly is especially useful because the accumulated tolerances of the components are such that light can be emitted from the TO-can, imaged through the lens and launched into the fiber. For example, the coupling tolerance (3 dB down from maximum coupled power) of a large core glass fiber relative to a laser diode imaged through a ball lens is on the order of ±3.5 mils (approximately 90 μm). An example of a design of the optical coupling assembly 30 includes a metal ST connector developed by Ensign-Bickford for its 200/230 μm large core glass fiber. This connector is a low cost connector because of its simple crimp and cleave assembly approach (i.e., no epoxy and no polishing). An alternate connector depending on the application would be an all plastic connector.

Figure 5:
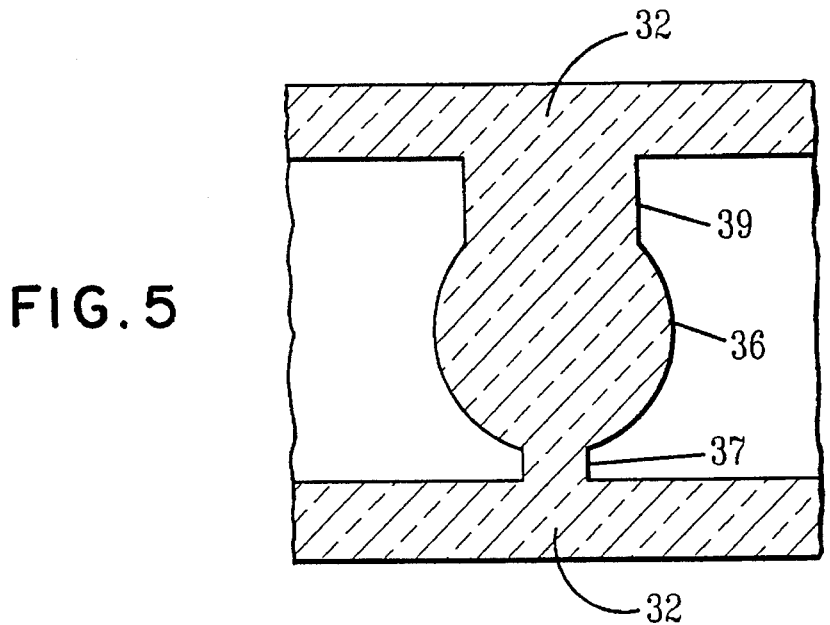
FIG. 5 is a cross-sectional view showing the formation of a spherical lens integral with a coupling assembly.

The optical coupling assembly body 32 in one embodiment is made of a transparent material such as polycarbonate because of its mechanical strength, moldability and optical transparency in the relevant wavelength region. Amorphous polyolefin, polymethyl methacrylate, polystyrene, and the like can also be used. In one preferred embodiment, the optical coupling assembly 30 is molded in a single plastic molding step so that the body 32, the lens 36, the light source fixing means 40, the fiber optic connector interface connector means 38 and bushing connector 48 are all molded in a single molding step. In a preferred injection molding process, the lens 36 is molded with an asymmetric lens design to eliminate potential defects such as internal voids, well lines, gas traps or other defects along the optical axis. FIG. 5 is a cross-sectional diagram showing that the major flow of plastic is through the lens 36 so that any bubbles or imperfections will be in the neck 37. Plaster will flow from the body 32 on both sides of the lens 36, but because neck 39 is much larger than neck 37, plaster will flow through and form the entirety of lens 36 and "meet" in neck 37 rather than within the area of lens 36.

In the injection molding process, the raw material is dried with heated air to remove water vapor, then heated to a processing temperature well above its melting point through the application of mechanical (shear) and thermal (electrical resistance) energy. The material is plasticised to the consistency of a viscous fluid, and injected under high pressure into one or more mold cavities. Process temperatures and pressures are controlled to prevent discoloration or molecular weight degradation of the polymer. Continued pressure is applied until the polymer has cooled well below its melting point to assure uniform density throughout the optically active portion of the lens, prevent the formation of shrinkage voids in the material, and maintain dimensional accuracy. The injection mold is designed to control the material path into the lens to prevent the entrainment of air in the lens body, and to prevent jetting of material directly into the optically active area of the lens.

Figure 4:
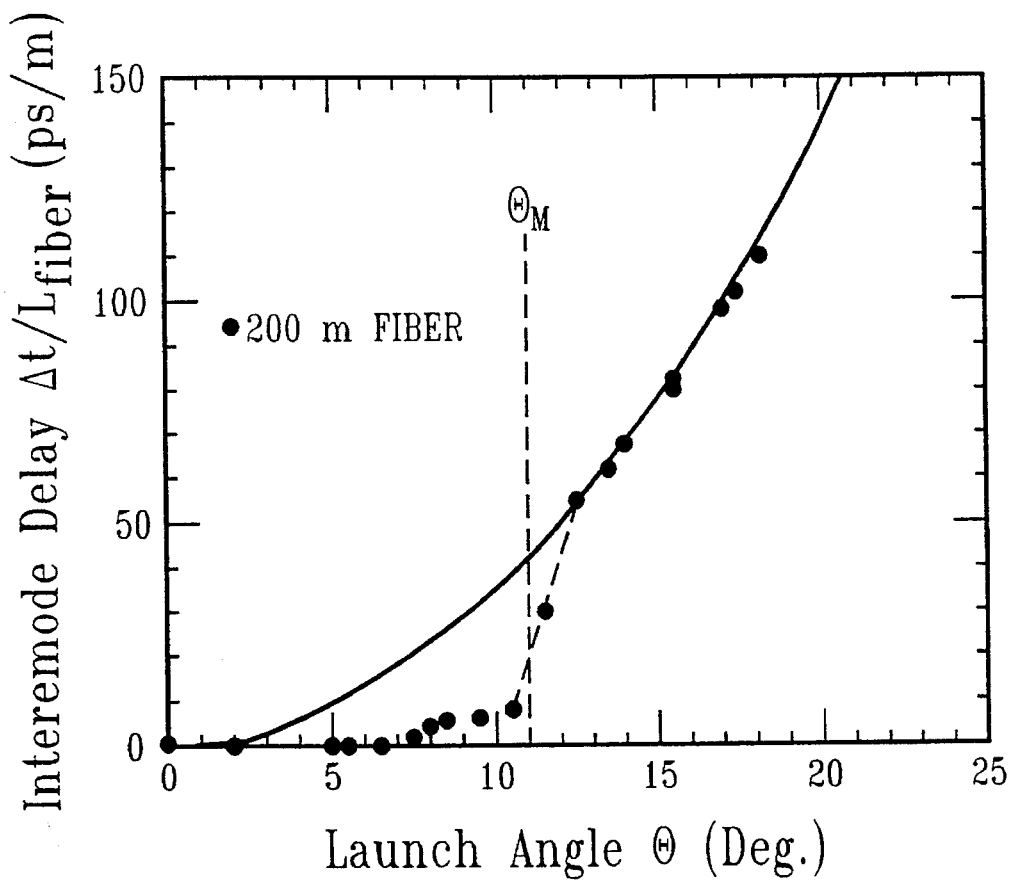
FIG. 4 is a graph plotting the intermode delay as a function of launch angle showing in theory the $\theta_M$ for a 200 meter fiber.

The optical filter light transmission apparatus of the present invention provides light source to fiber coupling which enables a reproducible high bandwidth. The present invention also allows relaxed alignment tolerances and enables simple snap together optics. The reproducible high bandwidth provided by introducing light from the light source into the fiber at an angle $\theta_L$, less than or equal to a predetermined angle $\theta_M$, where $\theta_M$ is typically less than $\theta_S$ and is the maximum angle at which substantially intermode delay will occur as the light propagates down the fiber. In practice, $\theta_M$ will be determined by experimentation for various fiber optic cross-sectional diameters and transmission link distances. A plot of the intermode delay as a function of launch angle will be made from which $\theta_M$ is determined. FIG. 4 is a sample of such a plot for a 200 meter fiber. The intermode delay which is the difference in mode arrival time, $\Delta t$, divided by the length of the fiber is plotted against the launch angle in degrees. As shown in this theoretical example, a launch angle greater than 11° will result in significant intermode delay. Thus, in this example, $\theta_M$ will equal 11° and therefore the launch angle $\theta_L$ will be 11° or less. Once $\theta_M$ is determined, the diameter of the lens to provide a proper launch angle can be determined by the formula $D_L \pm 2d \tan \theta_L$ where $D_L$ equals the lens diameter, $\theta_L$ is the launch angle and d is the source to lens distance. This equation applies for lens magnification 1. For all other lens magnification M, $\theta_L$ is $\pm \theta_S/M$. A proper launch angle can be maintained by reducing the effective lens diameter, $D_L$, or by adding an aperture or by changing the magnification of the lens or by any combination of these to keep $\theta_L$ less than $\theta_M$. The lens makers equation or ray tracing of lens design may be utilized to limit $\theta_L$ to the desired angle.

While the invention has been particularly shown and described with respect to preferred embodiments thereof, it should be understood by those skilled in the art from the foregoing that changes in form and details may be made therein without departing from the spirit and scope of the invention which should be limited only by the scope of the appended claims.

Having thus described the invention, what is claimed as new and what is desired to be secured by Letters Patent is:

1. An apparatus for improving the bandwidth of a large core step-index optical fiber communication link comprising:

means for launching light from an optoelectronic component into an optical fiber at an angle, $\theta_L$, less than or equal to a predetermined angle $\theta_M$, where $\theta_M$ is less than $\theta_S$, $\theta_S$ being the angle at which light diverges from the optoelectronic component, and $\theta_M$ is the maximum angle at which substantially no intermode delay will occur as the light propagates down the fiber, said launching means comprising a lens.

2. The apparatus of claim 1, wherein said lens comprises an optical lens.

3. The apparatus of claim 2 wherein said optical lens includes spherical aberrations.

4. The apparatus of claim 1, wherein said launching means further comprises an aperture.

5. The apparatus of claim 1 wherein said launching means is integral with a fiber optic coupling assembly.

6. The apparatus of claim 5 wherein said integral fiber optic coupling assembly comprises an optoelectronic component receptacle, said launching means and an optical fiber connector means.

7. The apparatus of claim 6 wherein said integral fiber optic coupling assembly is comprised of integrally molded plastic.

8. The apparatus of claim 6 wherein said integral fiber optic coupling assembly includes first locating means for fixing the position of the optoelectronic component with respect to said launching means, and second locating means for fixing the position of the optical fiber with respect to said launching means.

9. The apparatus of claim 5 wherein said launching means further comprises an aperture.

10. An optical fiber light transmission apparatus for improving the bandwidth of a large core short length optical fiber communication link comprising:

an optoelectronic component for generating light diverging at an angle $\theta_S$;

a step-index optical fiber of a length of 500 m or less and a diameter of 200 µm or greater; and launch means for limiting the optical modes of $\theta_S$ launched into said fiber such that the bandwidth of said fiber is about 30 to 60% greater than the bandwidth of said fiber if the optical modes of $\theta_S$ launched into said fiber were maximized, said launch means comprising a lens.

11. The apparatus of claim 10 wherein said lens comprises an optical lens.

12. The apparatus of claim 11 wherein said optical lens includes spherical aberrations.

13. The apparatus of claim 10 wherein said launch means further comprises an aperture.

14. The apparatus of claim 10 wherein said launch means is integral with a fiber optic coupling assembly.

15. The apparatus of claim 14 wherein said integral fiber optic coupling assembly comprises an optoelectronic component receptacle, said launch means and an optical fiber connector means.

16. The apparatus of claim 15 wherein said integral fiber optic coupling assembly is comprised of integrally molded plastic.

17. The apparatus of claim 15 wherein said integral fiber optic coupling assembly includes first locating means for fixing the position of the optoelectronic component with respect to said launch means, and second locating means for fixing the position of the optical fiber with respect to said launch means.

18. The apparatus of claim 14 wherein said launch means further comprises an aperture.

19. An apparatus for improving the bandwidth of a large core short length optical fiber communication link comprising:

an optoelectronic component for generating light diverging at an angle $\theta_S$;

an optical fiber of a length of 500 m or less and a diameter of 200 µm or greater; and launch means for introducing light from said optoelectronic component into said fiber at an angle, $\theta_L$, less than or equal to a predetermined angle $\theta_M$, where $\theta_M$ is less than $\theta_S$, and is the maximum angle at which substantially no intermode delay will occur as the light propagates down the fiber, said launch-means comprising a lens.

20. The apparatus of claim 19 wherein said lens comprises an optical lens.

21. The apparatus of claim 20 wherein said optical lens includes spherical aberrations.

22. The apparatus of claim 19 wherein said launch means further comprises an aperture.

23. The apparatus of claim 19 wherein said launch means is integral with a fiber optic coupling assembly.

24. The apparatus of claim 23 wherein said integral fiber optic coupling assembly comprises an optoelectronic component receptacle, said launch means and an optical fiber connector means.

25. The apparatus of claim 24 wherein said integral fiber optic coupling assembly is comprised of integrally molded plastic.

26. The apparatus of claim 24 wherein said integral fiber optic coupling assembly includes first locating means for fixing the position of the optoelectronic component with respect to said launch means, and second locating means for fixing the position of the optical fiber with respect to said launch means.

27. The apparatus of claim 23 wherein said launch means further comprises an aperture.

* * * * *